Dec. 6, 1927.
W. A. SCHMELZ
1,651,472
SKINLESS WIENER AND APPARATUS FOR MAKING SAME
Filed Oct. 19, 1925    2 Sheets-Sheet 1
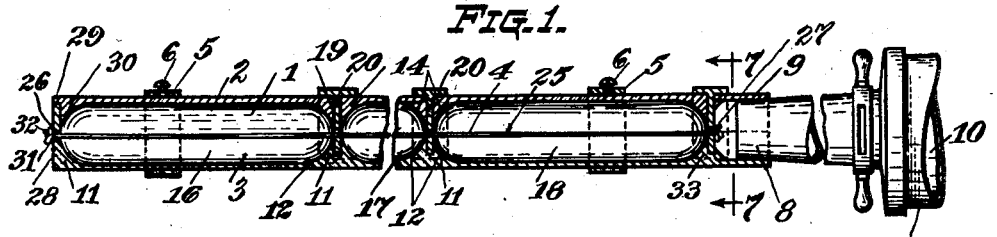
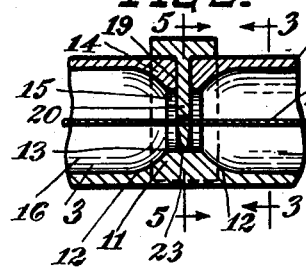
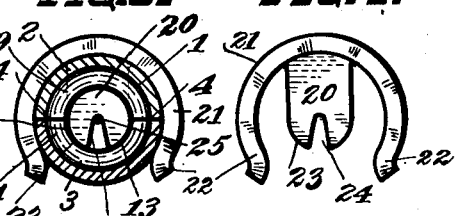
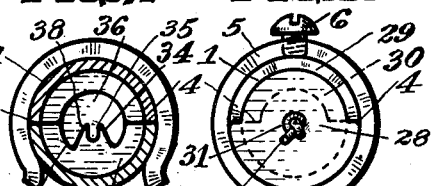
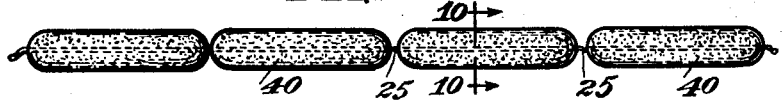
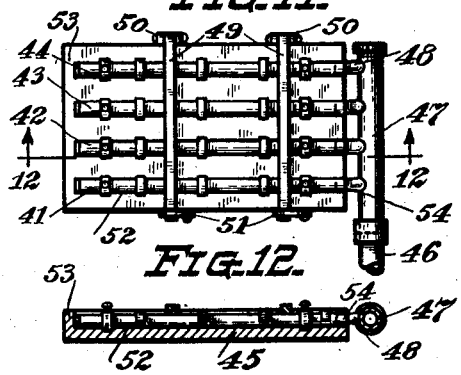
W.A. SCHMELZ,
INVENTOR,
by William A. Hartle
ATTORNEY.

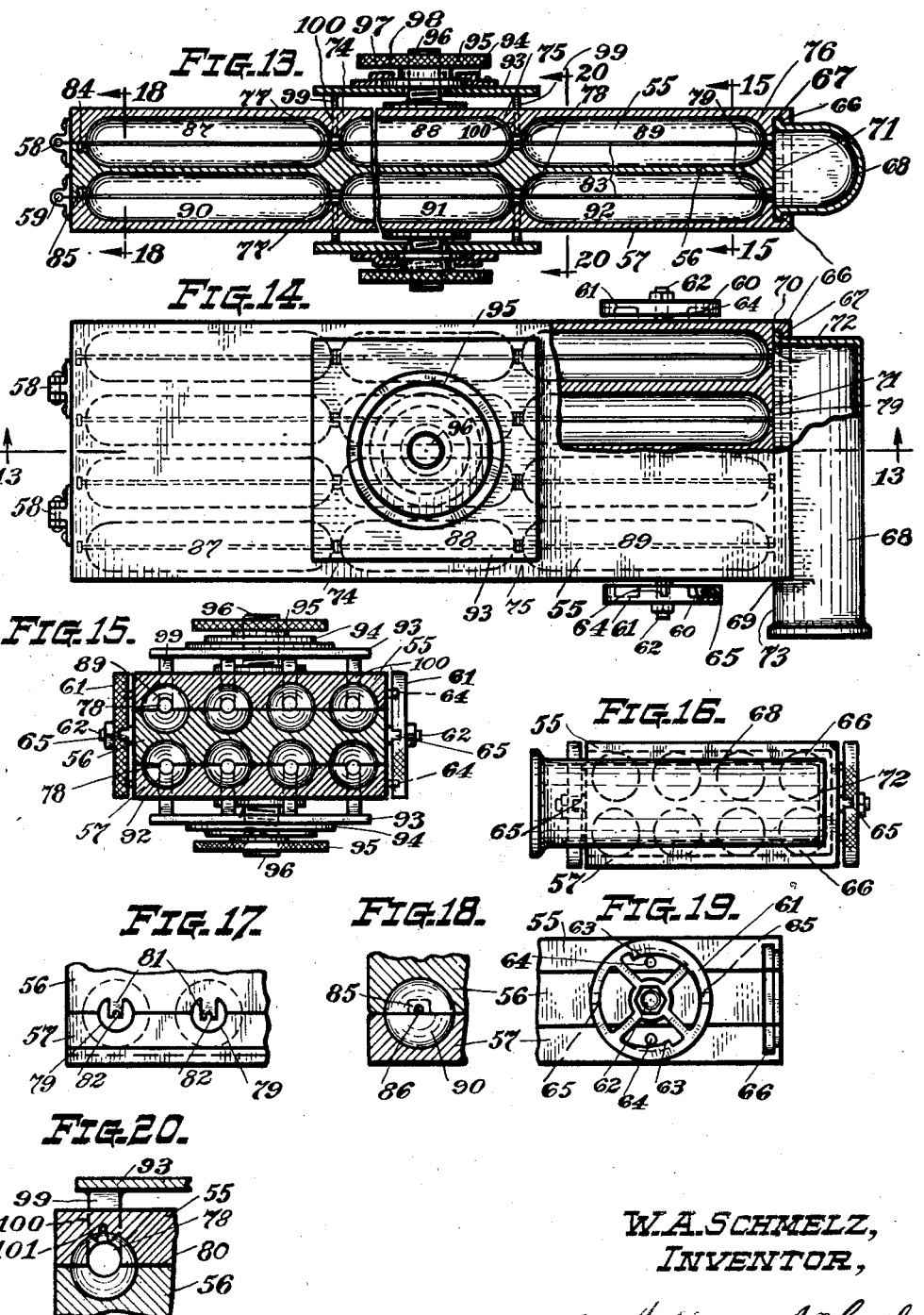
Dec. 6, 1927.
W. A. SCHMELZ
1,651,472
SKINLESS WIENER AND APPARATUS FOR MAKING SAME
Filed Oct. 19, 1925      2 Sheets-Sheet 2
W. A. SCHMELZ,
INVENTOR,
by William A. Hartle,
ATTORNEY.

Patented Dec. 6, 1927.

1,651,472

UNITED STATES PATENT OFFICE.

WILLIAM A. SCHMELZ, OF PITTSBURGH, PENNSYLVANIA.

SKINLESS WIENER AND APPARATUS FOR MAKING SAME.

Application filed October 19, 1925. Serial No. 63,348.

The present invention relates to a new article of manufacture, to-wit a "skinless wiener", and a device for manufacturing same, the purpose of which is to provide a wiener, sausage or similar product, having no covering of entrails usually found on the exterior surface of such a product.

The abolition of the use of the entrail covering on wieners or the like results in a great saving in the cost of production, and the new article so produced in accordance with this invention hereinafter explained, surpasses in attractiveness and desirability the appearance of the wiener in common use, which has an entrail covering.

In the case of the ordinary wiener, several of them are connected together by the entrails covering the wieners, and with the present invention it will be seen that I have provided a means of connecting the individual wieners to each other, and thus facilitate handling in trade, as will be brought out more fully as the description proceeds in the following specification.

In the description I have shown a means for producing my invention in multiples, as well as in quantities, and use for this purpose "stuffers" or devices commonly used in this line of industry for filling wieners, sausages, bolognas etc. which have a covering of entrails, so that my invention can readily be used with the ordinary devices found in the trade.

In the drawings forming part of this specification, I have shown a means of manufacturing the "skinless wiener" in a very simple form, and modifications adapted to produce the article in quantities for the trade.

In the drawings Figure 1 is a vertical central section of a device arranged and adapted to manufacture wieners in multiple form.

Figure 2 is an enlarged vertical section of a portion of Figure 1.

Figure 3 is a vertical transverse section taken on line 3—3 of Figure 2.

Figure 4 is a front view of a fastening means used.

Figure 5 is a vertical transverse section of the lower section of the device shown in Figure 1, taken on line 5—5 of Figure 2.

Figure 6 is a vertical transverse section of the upper section of the device taken on line 5—5 of Figure 2.

Figure 7 is a vertical section on line 7—7 of Figure 1.

Figure 8 is an end view taken from the left of Figure 1.

Figure 9 is a side view of a number of "skinless wieners" connected to each other, as produced in my invention.

Figure 10 is a transverse section on line 10—10 of Figure 9.

Figure 11 is a plan view of a modified form of device showing means for manufacturing the skinless wieners in quantities.

Figure 12 is a vertical section of Figure 11, on line 12—12 of Figure 11.

Figure 13 is a central vertical section of a modified form of device for making skinless wieners, taken on line 13—13 of Figure 14.

Figure 14 is a plan view of the device shown in Figure 13.

Figure 15 is a vertical transverse section on line 15—15 of Figure 13.

Figure 16 is an end view of Figure 13 taken from the right thereof.

Figure 17 is an enlarged detail of a portion of Figure 13.

Figure 18 is also an enlarged detail of a means for securing the end of a sterilized string used with the device.

Figure 19 is a partial side view of a locking means used.

Figure 20 is an enlarged section of one of the division walls of Figure 13, showing one of the cutters used, and the aperture through the division wall; said section being taken on line 20—20 of Figure 13.

In the drawings the numeral 1 indicates a preferably metal tube made in two halves or sections 2, 3 which are separable from each other along lines 4, 4 Figure 3. The two sections 2, 3 are held together by means of a plurality of metal bands 5, 5 which are provided with screws 6, in order to bring pressure on the two halves or sections 2, 3 and prevent leakage of fluid material such as ground meat, spice etc. at points 4, 4.

The numeral 7 indicates what is known in the trade as a "stuffer", which is adapted to contain ground meat and the ingredients commonly used in making wieners, sausages, etc. The stuffer 7 has a tapered nozzle or "horn" 8, which is adapted to pressingly engage the filling end 9 of the metal tube 1 as shown in Figure 1 of the drawings, for a purpose explained below. Stuffers of the kind just described have usually a piston (not shown) within the barrel 10 thereof, adapted to reciprocate therein and force the ground meat filling under pressure through horn 8 into the tube 1, as is at once understood.

The construction in detail of the metal tube 1 is illustrated by the Figures 1 to 8 inclusive of the drawings clearly, in which the lower half or section 3 is provided with a number of inner vertical walls 11, which are preferably rounded after the form of a sphere as at 12, to form the ground filling used in making wieners, into "wiener shape" at the end thereof. It is seen from Figures 2, 3 and 5 that this wall 11 is pierced at 13 to form with the upper section division wall 14 a circular aperture 15, between the successive adjacent chambers 16, 17 and 18 of Figure 1. It will be seen that the division wall 14 has a slot 19 formed therein adapted to receive the cutter or separator blade 20, and that the latter is preferably integrally mounted on an arcial and resilient metal band 21, the arms 22, 22, of which are adapted to encircle and grip the exterior walls of the sections 2 and 3 and hold itself after being placed in the slot 19 in proper position. The cutter blade 20 is preferably sharpened somewhat on the edge 23, in order to readily pass through the ground meat filling when the tube 1 is filled with meat, and said cutter 20 has a cut-away recess 24 which is designed to accommodate the centrally disposed sterilized cord or string 25 which passes through the tube 1 from point 26 to point 27 of Figure 1. The lower section 3 at one end has an end wall 28 which extends across the end of the tube 1, and fits the projecting end 29 of section 2. A curved or rounded spherical-like portion 30 is formed on section 2 near this end wall 28, and abuts same, as shown in Figures 1 and 8 of the drawings. A perforation 31 is made in the end wall 28 through which a string which has been sterilized is passed from the inner side of said wall and knotted on the outside thereof at 32. At the opposite end 9 of the tube 1 as shown clearly in Figures 1 and 7 the division wall 33 of the lower section 3 is formed with a projecting portion or extension 34, in which a slot 35 is formed, for receiving the knotted end of the sterilized cord 25. The cutter 36 is made slightly different at 37, 38 than the cutters 20, 20 in order to accommodate the extension 34 of section 2 as is readily understood.

The operation of the device is as follows. The stuffer 7 is filled with ground meat, spice, etc. ordinarily used in making wieners, and by means of said stuffer the "filling" is forced into the end 9 of the tube 1. It will be noted that the cutters 20, 20 and 36 are not placed in the tube 1 while same is being filled, as it is necessary for the perforations 15, 15 etc. to be unobstructed at this time so that the filling of meat can be readily forced into the successive chambers 18, 17 and 16 of tube 1. After the tube 1 is filled, the cutters 20, 20, 36, etc. are forced into position in their respective slots of the division walls 14, 14, thereby forming the individual wieners only joined to each other by the sterilized core string 25. The tube 1 is now removed from the horn 8 of the stuffer, and is placed in boiling water, in vats for the purpose, and cooked thoroughly until the whole substance of the wieners is solidified, and adapted to be handled in trade. The metal bands 5, 5 and cutters 20, 20, 36 are now removed from the sections, and the latter separated from each other, and the wieners, which are still connected to each other by the core string 25 removed from the tube 1. It will be noted that the whole of the wieners 40 after proper boiling, or heat treatment, becomes quite hard, and said wieners can readily be handled without crumbling, as has been proven in practice. The string 25 is usually made to pass through six or more of the wieners, for convenient handling, and said string is readily withdrawn when the wieners are ready to be served. It is further found from experience that the sterilized string is desirable for sanitary purposes, and that same should be of not too small diameter in order to present a considerable adhesional surface to the meat filling, and hold the "string" of wieners together for handling purposes.

In the modification shown in Figures 11 and 12 of the drawings I have shown how the device can be used in multiple form in which 41, 42, 43, and 44 represent a series of tubes similar to tube 1 just described, and can be suitably mounted in a supporting base 45. A stuffer horn 46 is connected to the filler pipe 47, the latter having a plurality of small feed nozzles 48, 48 etc. which in turn are removably connected to tubes 41 to 44 inclusive. In this manner a number of tubes can be filled quickly with ground meat and spice filling, and the individual tubes 41 to 44 inclusive heat treated to properly cook the wieners, sausage, or bolognas. In some cases it will be found advantageous to construct the base 45 of light material such as aluminum, or the like, so that a cluster of tubes 41, 42 etc. may be handled as a unit when being cooked in the heating vats. It will be noted that the individual tubes 41, 42, 43, 44, are held in position on the base 45 by any suitable fastening means, such as the straps 49, 49 which are hinged at 50, 50 to the base, and secured at 51, 51 by hooks or the like. The base 45 is also provided with depressions 52, 52 designed to accommodate the tubes 41, 42, etc.; and an abutment 53 is preferably used to hold the tube ends in alignment, and also to get tight connections between the tube ends and the feed nozzles 48 at points 54, 54.

In the modification of the wiener making device shown in the Figures 13 to 20 inclusive of the drawings, I have shown a double-deck apparatus consisting of three castings preferably, to wit, 55, 56 and 57. Said castings are hinged together at points 58, 59, so that upper section or casting 55 separates from section 56 pivoting at the hinges 58, 58; and lower casting 57 separates from the central section 56 pivoting at hinges 59, 59. A locking means for holding the sections together is shown at 60, 60, and same comprises a wheel 61, pivoted on the pintle 62, and revoluble thereon. Two cam-shaped portions 63, 63 are formed on the inner face of the rim of the wheel 61 as shown in Figure 19 clearly. Pins 64, 64 are rigidly mounted on the sections 55 and 57, same being adapted to engage the cams 63, 63 in such a manner that when the wheel 61 is properly revolved into engagement, that the cams and pins 64 are held in jamming engagement, thereby securely holding the sections 55, 56 and 57 in locked and closed positions. In order to free the sections from each other it will be seen that the wheel 61 is revolved to the left as seen in Figure 19 of the drawings and the cams loosened from the pins 64. When the wheel 64 has been turned to the left sufficiently far to bring the slots 65, 65 opposite to the pins 64, 64. it is apparent that the sections 55 and 57 may be separated from the central section 56 of the device, each section revolving about the hinges 58, 59 etc. as is readily understood. In closing the sections and locking them together the opposite procedure is followed, and the wheels lockingly engage the pins 64 as in position shown in Figure 19.

The sections have formed in their right ends as seen from Figures 13, 14 and 16 clearly, a slot 66 adapted to engage the projecting edges 67, 67 of the horn 68 of a stuffing machine (not shown). It will be noted that the horn 68 slides into the slot 66 from point 69 towards point 70. The horn 68 is open at 71 on the side adjacent to the sections as can be seen best in Figure 1 of the drawings, for a purpose described below. The horn 68 is closed at points 72, 73 as shown. The sections 55, 56 and 57 have inner division walls 74, 75, 76 as shown each however having an aperture therethrough as at points 77, 78, 79. An enlarged view of the apertures at 77, 78 is shown in Figure 20, in which it is seen that the aperture is made preferably "off-center" with respect to the division line 80. The nature of the apertures at 79 can be seen from Figure 17 of the drawings in which it is evident that a projecting tongue 81 is formed thereat, which has a small slot 82 in the end of same, in order to hold the sterilized string 83 in proper position as will be explained. At the points 84, 85 small pockets are formed, each having an entrance slot 86 for the string 83, as shown in Figure 13 and enlarged in Figure 18. It will be noted that the pockets 84, 85 are each formed preferably in the central section 56 of the device, so that a knot can be made in the end of string 83, and readily inserted in said pockets when the sections 55, 56 and 57 are separated from each other. The sterilized string it is noted is secured in pocket 84, and is then passed through the apertures 77, 78 of the upper section; passes through the slots 82, of the projecting tongues 81 which are positioned in the apertures 79, 79 of the upper and lower sections 55 and 57; thence through the lower set of orifices 78, 77 in order named, and the end of said string is then secured in the pocket 85. It will be seen that as the string 83 is drawn taut, same will be held substantially in the center of the wiener chambers 87 to 92 inclusive, and a continuous string of wieners can in this way be formed all connected to each other. The wiener chambers are preferably rounded on the ends as shown, in the usual way before described. The foregoing description of the present modification of the device can be used without the additional portion of the device about to be described, if desired, and it is evident that same is a practical, easily handled device for the purpose in hand. If it is desired to make a finely finished product, and separate the individual wieners from each other, except so far as the central string 83 holds said wieners together, the device just described may be provided with the following additional parts. A flat horizontal plate 93 is used having revolubly mounted thereon, in the flanged cupshaped holder 94 a screw-threaded nut 95 adapted to ride on the complementary threads of the screw-threaded pin 96; the latter being rigidly mounted on the casting or section 55 as shown. The nut 95 is provided with a flange 97 which engages the flange 98 of the holding member 94, and it is seen that when the milled nut 95 is revolved on the screw-threaded pin 96 that the plate 93 will be raised or lowered with respect to the surface of the section 55. Beneath the plate 93 are mounted a number of cutters or knives 99, 99 each adapted to engage the complementary slots 100, 100 between the wiener chambers and in the division walls 74, 75, etc. and reciprocate therein when actuated by the screw-nut 95. The shape of the cutters are preferably as in Figure 20, a groove or slot being formed at 101 to accommodate the string 83. It will now be seen that the purpose of having the eccentrically formed apertures 77, 78 etc. is to make the knives or cutters 99 as short as possible, as is readily understood from Figure 20 of the drawings.

The cutting apparatus just described is duplicated on the under side of the section 57 as will be readily understood, and for the same purpose, in order to separate the wieners from each other. While one set of chambers vertically considered, to wit 87 to 92 inclusive have been described, it is apparent from the Figures 14 and 15 that the device is preferably made of a cluster of chambers as shown, so that a large number of wieners can be made at once. The operation of the device is similar to that described in connection with Figures 11 and 12 of the drawings. A stuffer (not shown) is used to fill the horn 68 with spiced ground meat, and same enters the apertures 79, 78, 77, in turn thus completely filling all the chambers of the device. The horn 68 is now slidably removed from the device, and the latter placed in boiling water to cook the meat, after which the screw-nut 95 is turned and the cutters 99, operated to sever the individual wieners from each other, and the cam-wheels 61 are properly turned to permit the sections to separate from each other. After which procedure the wieners can be readily removed in "strings" of six, connected together by the sterilized string 83.

I claim:—

1. In a wiener making device, an upper section having a locking pin mounted thereon, and a lower section having a cam wheel pintle mounted thereon, each section being provided with means for shaping the exterior surface of a wiener, and means for holding the sections together consisting of a cam wheel carried on the lower section pintle, and adapted to engage the locking pin of the other section, for holding the sections in compressive relation to each other.

2. In a wiener making device, an upper and a lower section, each provided with means for shaping the surface of the wieners, and means mounted in the sections, for severing the individual wieners from each other comprising a plurality of cutters, each having a slotted cutting blade formed thereon.

3. In a wiener device, an upper and a lower section having a series of adjacent chambers formed therein, each section having means for shaping said wieners, a sterilized means for connecting the individual wieners together, and severing means adapted to separate the individual wieners from each other, without severing the sterilized connecting means.

4. In a device for manufacturing wieners in multiple form, a mold composed of sections, and forming a number of connecting chambers, perforated division walls between the said chambers, a number of cutters mounted in the division walls, a core string passing continuously through the chambers, and means for holding the core string in taut position while the chambers are being filled with ground meat and spice.

5. A device for making skinless wieners comprising a mold formed of an upper and a lower section, with means for holding same together, a number of division walls formed in the sections, each having an aperture therethrough, and each having cutter slots formed therein, a number of cutter blades adapted to slidably operate in the division wall slots, a core string passing through the wall apertures, a pair of end walls adapted to hold the core string in taut position.

6. In a wiener making device, a means for severing individual wieners from each other comprising a supporting screw mounted on the device, a horizontal plate having a number of cutting blades formed thereon, a flanged cup-shaped holder on the horizontal plate, and a screw-threaded nut on the supporting screw, having a flange in engagement with the flange of the cup-shaped holder, and adapted to reciprocally actuate the horizontal plate and the cutting blades, as said screw-threaded nut is revolved on its support.

7. In a wiener making device, a locking means comprising a pair of locking pins mounted on the upper and lower section of the device, a pintle on the intermediate section of the device, a revoluble wheel mounted on the pintle, and a pair of oppositely positioned cams formed on said wheel, each adapted to engage one of the locking pins when the wheel is revolved, for holding the sections comprising the device in locked engagement with each other.

8. In a wiener making device, an upper and a lower section, each having means for shaping the surface of the wieners, means for severing the individual wieners from each other, comprising a plurality of cutters each with a slotted cutting blade formed thereon, and means for simultaneously actuating a number of the cutters.

9. In a wiener making device, an upper, a lower and an intermediate section, each adapted to shape the exterior surface of a wiener, means for locking the sections together, a pair of horizontal plates, each having a number of cutting blades mounted thereon, and means for actuating the horizontal plates and the cutting blades, for severing the individual wieners from each other.

10. In a wiener making device, an upper, a lower and an intermediate section, each adapted to shape the surface of a wiener, means for locking the sections together, and means for severing the individual wieners from each other comprising a pair of horizontal plates, each of which is mounted on one of the outer sections, a number of cutting blades formed on the horizontal plates, a pair of screw-threaded pins each of which is mounted on one of the outer sections, a pair of cup-shaped holders on the horizontal plates, provided with an inwardly-turned flange, and complementary nuts on the screw-threaded pins, each having a flange in engagement with a flange of one of the cup-shaped holders, for the purpose of actuating the horizontal plates and cutters, when the screw-threaded nuts are operated.

11. In a wiener device, an upper, a lower and an intermediate section, each adapted to shape the surface of a wiener, means for severing the individual wieners from each other, and means for locking the sections together, comprising a pintle on the intermediate section, locking pins on each of the upper and the lower sections, and a cam wheel mounted on the pintle, adapted to engage the locking pins.

12. In a wiener making device, an upper and a lower section, each having a plurality of chambers adapted to shape the surface of the wieners, an intermediate section having a plurality of chambers formed complementary to those of the upper and lower sections, division walls in the sections, each having apertures therethrough adjacent to each pair of wiener chambers, means for supporting a sterilized string in each aperture, and means for securing the ends of said string in the end walls of said sections.

13. In a wiener making device, upper and lower sections having chambers therein adapted to shape the surface of the wieners, an intermediate section having a series of chambers formed complementary to those of the other two sections, division walls in the sections, each having an aperture through them adjacent to each pair of wiener chambers, means for supporting a sterilized string in each aperture, and means for severing the individual wieners from each other.

14. In a wiener making device, upper and lower sections having wiener chambers therein, an intermediate section having wiener chambers formed complementary to those of the other sections, division walls in the sections, each having an aperture therethrough adjacent to each pair of the wiener chambers, means for supporting a sterilized string in the apertures, and means for locking the sections in close relation to each other.

15. In a wiener making device, an upper, a lower and an intermediate section, having chambers therein adapted to shape the surface of the wieners, division walls in the sections, each having eccentrically positioned apertures therethrough, a number of cutters mounted in the division walls, each having reentrant notches formed in the blade of said cutters, adapted to sever the individual wieners from each other, and means for reciprocating the cutters in the sections.

16. In a wiener making device, an upper, a lower and an intermediate section, having chambers formed therein adapted to mold the surface of the wieners, division walls in the sections, each having eccentrically located apertures through them, a number of cutters in the division walls adapted to sever the individual wieners from each other, locking pins on each of the two outer sections, a pintle on the intermediate section, and a revoluble cam wheel on the pintle, adapted to engage the locking pins, and lock the sections together.

17. In a wiener making device, an upper, lower and intermediate section, having a plurality of wiener chambers therein, division walls in the sections each having an aperture adjacent to the ends of adjoining wiener chambers, projecting tongues having reentrant notches therein, positioned in the division wall apertures, for holding the sterilized string which connects the wieners together, a plurality of cutters in the division walls having a reentrant notch in each, formed complementary to the notches in the said projecting tongues, pockets formed in the end wall of the intermediate section, for securing the ends of the sterilized string, and a slot formed in the end wall of the sections, adapted to receive the projecting flange of the horn of a stuffing machine.

In testimony whereof I affix my signature.

WILLIAM A. SCHMELZ.